Patented Jan. 19, 1937

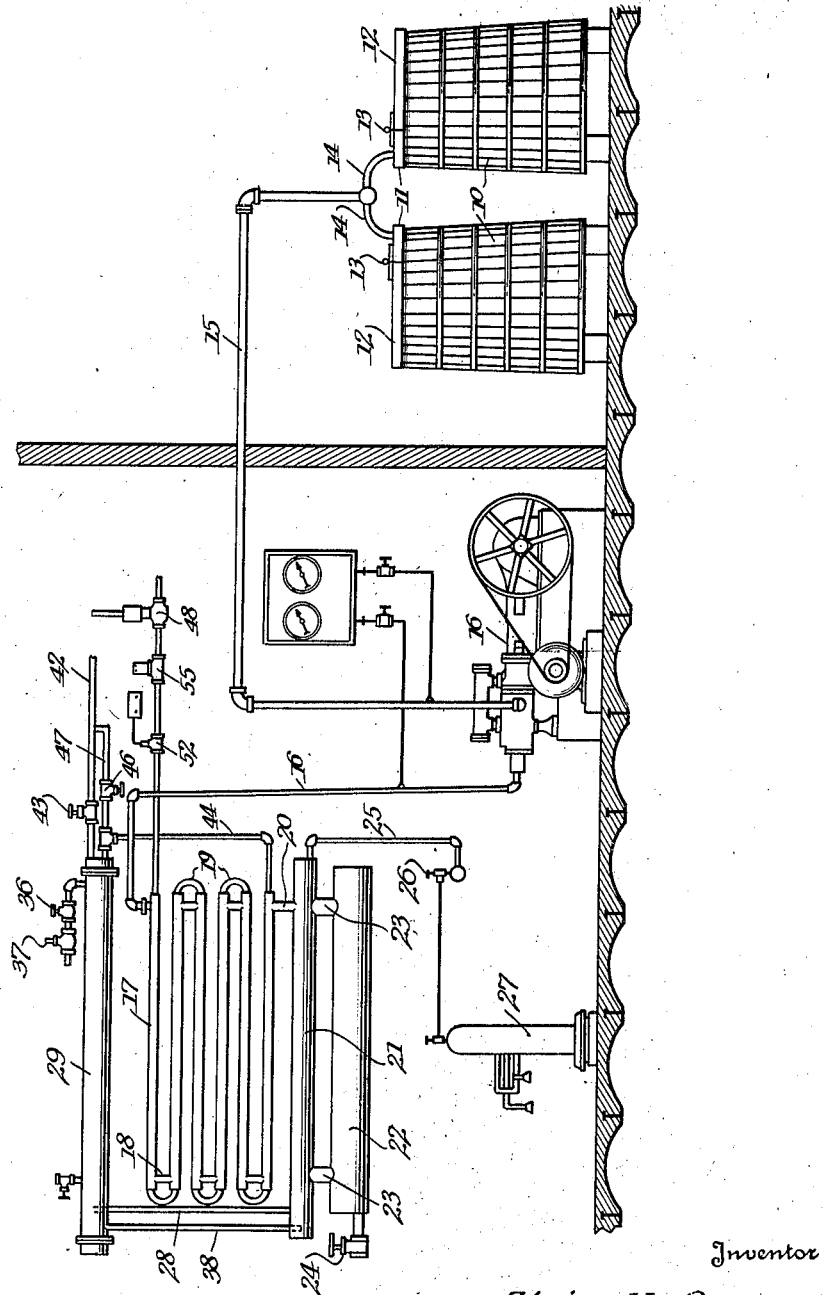

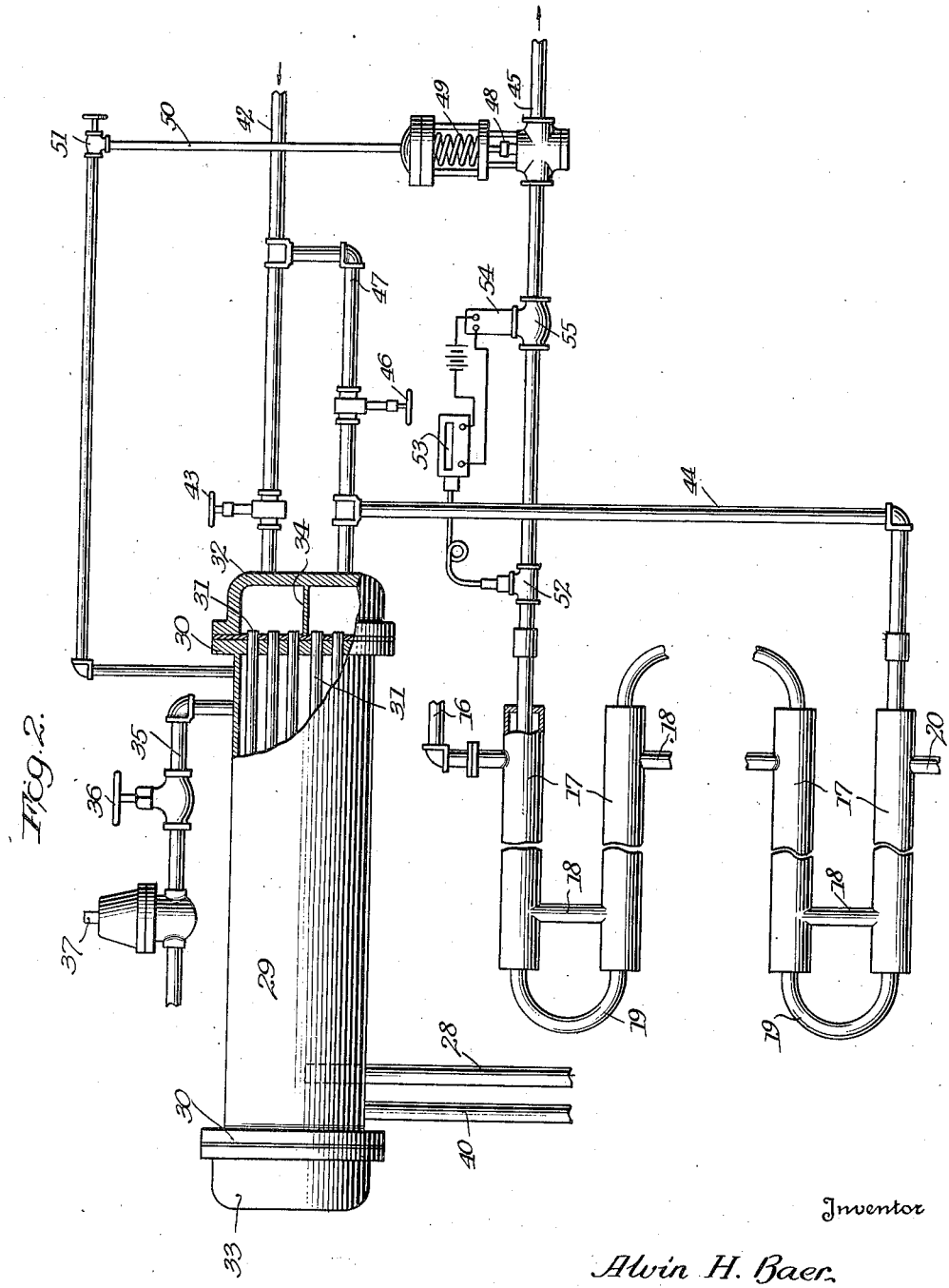

2,068,221

UNITED STATES PATENT OFFICE 2,068,221

GAS SEPARATION

Alvin H. Baer, Carbondale, Pa., assignor, by mesne assignments, to Worthington Pump and Machinery Corporation, Harrison, N. J., a corporation of Virginia Original application May 1, 1934, Serial No. 723,421. Divided and this application October 4, 1934, Serial No. 746,904

8 Claims. (Cl. 62—175.5)

My invention relates to a process of gas separation, and specifically to a process of separating carbon dioxide from a mixture including other gases. It is an object of the invention to provide a continuous process of liquefying a gas to separate it from such a mixture, specific characteristics of which process are hereinafter described. Other objects of the invention will appear from the subjoined description.

This application is a division of my application Serial No. 723,421, filed May 1, 1934 now matured into Patent No. 2,018,594, issued October 22, 1935.

Referring to the drawings, which are made a part of this application and in which similar reference characters indicate similar parts:

Fig. 1 is an elevation of the essential parts of a system of the character described, and Fig. 2, a diagrammatic view in elevation showing certain parts on a larger scale.

In the drawings, reference character 10 indicates fermenting vats which may be of any desired character, such as used in breweries, distilleries, etc. The vats are shown as provided with special collecting covers each consisting of a fixed part 11 and a movable part 12 connected to parts 11 by hinges 13. Branch pipes 14 lead from the vats 10 to a pipe 15 and it will be understood that any desirable number of fermenting vats may be thus connected to a delivery pipe 15.

The delivery pipe 15 connects the vats to a multi-stage gas compressor indicated generally at 16, which compressor draws the gas from the fermenting vats, compresses it and delivers the compressed material through a pipe 16 to a cooler-condenser embodying a plurality of pipes 17 which are connected in series by pipes 18. It will be understood that the compressor draws from the fermenting vats a mixture of carbon dioxide, water vapor, air, etc., the percentage of the various constituent gases varying according to conditions in the vats. If there is more than one vat fermentation will begin at different periods in the different vats and thus will provide a leveling effect to a certain extent tending toward uniform suction for the compressor. Insofar as the gas resulting from fermentation is not sufficient to satisfy the suction of the compressor other vapors will be drawn off including water vapor and air, all of which will be compressed and forced through pipe 16 to the cooler-compressor.

In addition to pipes 17 and 18 the cooler-condenser includes means for cooling the mixture of gas passing downward in a tortuous path through pipes 17 and 18. Such means in the form here illustrated comprises a bent pipe 19 by means of which a current of cooling medium can be passed through the pipe 17, this current being preferably in a direction counter to the flow of the mixture of gases.

The lowermost pipe 17 is connected by a pipe 20 to a receiver 21 for liquid coming from the cooler-condenser, including liquid carbon dioxide, water, etc. Underneath the receiver 21 there is provided a sub-receiver 22 connected to receiver 21 by pipes 23 and this provides for fractional separation of water or other heavy liquids from the liquid carbon dioxide in receiver 21, the heavier liquids settling in sub-receiver 22 and being drawn off at convenient times through a passage controlled by valve 24. The accumulated liquid carbon dioxide may be drawn off at convenient periods through a pipe 25 controlled by a manual valve 26 and may be led to a point where cylinders 27 can be filled with the liquid.

In the operation of the cooler-condenser non-condensible gases will be forced into the upper part of receiver 21 together with some carbon dioxide or other readily condensible gases which have not yet been condensed and such non-condensed gases are led off through pipe 28 to a super-cooler 29, the pipe 28 extending some distance up into the interior of the super-cooler as indicated in Fig. 2 so as to carry the gases above the liquid level in the casing of the super-cooler.

The super-cooler 29 comprises an outer shell with heads 30 in which is mounted a set of pipes 31. The ends of the casing may be closed by caps 32, 33 and the cap at the right-hand end has a partition 34 dividing it into two compartments. A pipe 35 leads outward from the casing, said pipe providing means for egress of non-condensible gas. Such egress is controlled by a valve 36 which is open at all times when the system is working and is further controlled by a spring-pressed valve 37, which valve is also provided with means for adjusting its pressure, so as to correspond to a predetermined pressure at which it is desired that the uncondensed gas shall be released. A pipe 40 leads from the lower part of the casing of the super-cooler to a point below the normal liquid level in the receiver 21, this being for returning to the receiver such liquid as is condensed in the super-cooler.

The cooling means previously alluded to includes a pipe 42 for introducing a cooling medium into the system, e. g., cold water. A valve 43 controls the inlet through this pipe to the upper compartment in cap 32 from which the water flows through the upper set of pipes 31 to the hollow cap 33, then back through the lower set of pipes 31 to the lower compartment of cap 32, then through a pipe 44 to the tortuous pipe 19 and out of the system (or the illustrated portion of the system) by way of a pipe 45. In emergencies the valve 43 may be closed and cold water caused to flow directly from pipe 42 into pipe 44 by opening a valve 46 in a branch pipe 47.

Egress of water from the cooling pipes is controlled by a pressure-responsive valve 48 movable toward closed position by a spring 49, the pressure of which is adjustable as by means of a pipe 50 communicating with the interior of the super-cooler 29 and having a valve 51 for admitting more or less pressure for acting on the spring 49. The egress of water is further controlled by the temperature of the water at or near the point of discharge, said means comprising a thermostat 52 of any desired construction arranged to close a circuit at 53 and thus to energize an electro-magnet 54 which opens a valve in the valve casing 55 interposed between parts of pipe 45.

In the operation of my device, carbon dioxide gas is drawn through the suction pipe 15 by the compressor 16, with other gases as above stated; all of which are compressed and forced through pipe 16 to the double-pipe condenser section of the condenser-cooler where they pass through the spaces between concentric pipes and the carbon dioxide gas will nearly all be liquefied, passing now to the receiver 21 together with water, air, water vapor, etc. The heavier liquids will accumulate in the sub-receiver by stratification and the non-condensed gases will pass to the super-cooler for further treatment, as above set forth.

It will be evident that the pressure developed by the compressor in the mixture of $CO_2$ gas, air, water vapor, etc., must be such as to cause liquefaction of at least the greater part of the more liquefiable ingredients of the mixture when the same is at the temperature produced by the counter current of cooling liquid in the pipes of the cooler-condenser, this temperature being substantially that of the water at the point where it leaves the cooler-condenser, through pipe 45. If water is used as the cooling medium in the cooler-condenser (water being a cheap and readily available cooling medium and therefore in common use) there will ordinarily be variations in the temperature of the water as between the temperature by day and by night, and also variations from day to day during a season, as well as the usual seasonal variations. Lower temperature of the cooling liquid will cause liquefaction to take place at lower pressure, while higher temperature of the cooling medium will require higher pressure to produce liquefaction, and even such changes of temperature as occur during a day, or between night and day, will change quite materially the amount of pressure required for liquefaction. In order to operate properly and efficiently such a system as that herein disclosed and to compensate for the variations of temperature artificial control is necessary and such control should be automatic for minor variations but may be manual for major variations such as those between different seasons of the year in the temperate zones.

This system, therefore, provides means by which the operator can determine in advance a higher liquefying pressure than any which the variable water temperature for a given part of a season would create. Having determined this artificial pressure, the operator adjusts relief valve 37 to release air and non-condensible gases to the atmosphere at the artificial pressure determined; valve 36 of course is open at all times when the system is working. The operator then adjusts control valve 48 so that the flow of water through pipe 45, the tubes 31 of the super-cooler pipe 44, pipes 19 of the cooler-condenser and outlet pipe 45 will be throttled sufficiently to cause the water to be heated in passing through the super-cooler 29 and the cooler-condenser to such a point that the liquefying pressure will be substantially equal to, but less than the artificial pressure for which valve 37 is adjusted.

It will be seen that when the air and non-condensible gases pass into super-cooler 29, they meet the colder surface of the tubes through which the water supply first passes, and if any of the $CO_2$ gas has been carried along, it will be liquefied at this point and drained back to the receiver 21 through the small vertical pipe 40, which is attached to the underside of super-cooler 29 and passes through, and some distance into, the interior of receiver 21. At the same time, the gases that will not condense gradually fill super-cooler 29, also the upper portion of receiver 21, and begin to occupy a small part of the space between the pipes 17 and 19 of the cooler-condenser. Having less effective surface for liquefying, a slightly increased pressure results and some of the air and non-condensible gases are thus pushed through valve 37.

Thus a continuous operation of the entire system with substantially automatic control of its functions is secured. The compressor continues to draw from the fermenting vats regardless of the uniformity of fermentation. The regenerative apparatus continues to function as a liquefier and separator of the $CO_2$ from the other elements. The release of the other elements to the atmosphere and to the sub-receiver 22 is also automatic. In like manner, variations in the temperature of water supply, due to changes of weather and otherwise, are automatically compensated. Wide variations of water supply resulting from seasonable changes are provided for by periodically changing the adjustment of valve 37 and of valve 48 to be in accord therewith.

It will be obvious to those skilled in the art that many alterations may be made in the method herein disclosed and that it may be used for other purposes; therefore I do not limit myself to what is shown in the drawings and described in the specification but only as indicated in the appended claims.

It is within the contemplation of my invention to use either the thermostatic means or the pressure-controlled means for governing the egress of water, since either one or the other will be sufficient in most cases, though in some instances the pressure control will be preferred while in others the means controlled by the temperature of the water will be preferred. Only in situations where control is especially difficult will both be used, as shown in Fig. 2.

Having thus fully described my said invention, what I claim as new and desire to secure by Letters Patent is:

1. A method for continuous recovery of carbon dioxide from a mixture of gases, comprising compressing the mixture, cooling the compressed mixture by a current of cooling medium to liquefy the carbon dioxide gas and other ingredients liquefiable at similar pressure and temperature, separating liquid carbon dioxide from other liquids by stratification, super-cooling non-condensed gas to liquefy remaining carbon dioxide gas, releasing the non-condensed gas when it attains an artificially predetermined pressure, and controlling the discharge of cooling medium from the cooling means when it attains an artificially determined temperature and pressure.

2. A method for recovery of carbon dioxide or the like from a mixture of gases comprising compressing the mixture, cooling the compressed mixture by means of a fluid current so as to liquefy the gas to be recovered, separating the liquid from the non-condensed gas, super-cooling the non-condensed gas for further recovery of the gas to be recovered, providing for release of non-condensible gas at an artificially predetermined pressure, and controlling the discharge of cooling fluid so as to bring the liquefying pressure substantially up to said artificially set pressure.

3. A method for continuous recovery of liquefiable gas from a mixture of gases comprising compressing the mixture, cooling the mixture by the action of a counterflow of said mixture and a cooling fluid so as to liquefy the gas to be recovered, separating the liquid from the uncondensed gases, supercooling the residual gases by exposing them to the action of a counterflow of said cooling fluid prior to the aforesaid treatment of the compressed gases, releasing the uncondensed gas when it attains a predetermined pressure, and controlling the flow of cooling fluid so as to bring the liquefying pressure nearly up to said predetermined pressure.

4. A process of gas separation comprising the steps of cooling a mixture of gases by a counterflow of cooling fluid, separating liquefied material from the mixture, supercooling the gaseous residue by a counterflow of the same cooling liquid prior to said first-mentioned cooling operation, providing for release of non-condensed gases upon reaching a predetermined adjustable pressure, and controlling the flow of cooling fluid so as to bring the liquefying pressure nearly up to such predetermined pressure.

5. A process of gas separation comprising the steps of cooling a mixture of gases by a counterflow of cooling fluid, separating liquefied material from the mixture, supercooling the gaseous residue by a counterflow of the same cooling fluid prior to said first-mentioned cooling operation, providing for release of non-condensed gases upon reaching a predetermined adjustable pressure, and controlling the escape of cooling fluid automatically in accordance with the pressure of such non-condensed gases.

6. A method for continuous recovery of a liquefiable gas from a mixture of gases comprising compressing the mixture, cooling the compressed gases by means of a fluid current to liquefy the gas to be recovered, permitting escape of non-condensed gas above a predetermined pressure and automatically varying the flow of the cooling fluid in accordance with the pressure of gas in the system and with the temperature of the cooling fluid adjacent its point of discharge.

7. A method for recovering a condensible gas from a mixture comprising compressing the mixture, cooling the compressed mixture by means of a fluid current to liquefy the gas to be recovered, permitting non-condensed gas to escape at a predetermined pressure, and automatically varying the flow of cooling fluid in accordance with the pressure of the non-condensed gas.

8. In a continuous process for recovery of a condensible gas from a mixture, the steps of compressing the mixture, passing the compressed material in heat-exchanging relation to a current of cooling fluid to liquefy the gas to be recovered, permitting non-condensed gas to escape at a predetermined pressure, and automatically varying the outflow of cooling fluid in such a manner as to maintain the pressure of gas in the condenser approximately at the relieving pressure at which non-condensed gas is permitted to escape regardless of changes in the temperature of the cooling fluid.

ALVIN H. BAER.